UNITED STATES PATENT OFFICE.

JULIUS HERBABNY, OF OFFENBACH-ON-THE-MAIN, GERMANY, ASSIGNOR TO K. OEHLER, ANILIN AND ANILINFARBEN FABRIK, OF SAME PLACE.

CLARET-RED DISAZO DYE AND PROCESS OF MAKING SAME.

SPECIFICATION forming part of Letters Patent No. 666,867, dated January 29, 1901.

Application filed August 28, 1900. Serial No. 28,319. (Specimens.)

*To all whom it may concern:*

Be it known that I, JULIUS HERBABNY, chemist, doctor of philosophy, residing at Biebererstrasse 32, Offenbach-on-the-Main, in the Grand Duchy of Hessen, Germany, have invented new and useful Improvements in Claret-Red Disazo Dyestuffs, of which the following is a specification.

If acetyl-2:5-amidonaphthol-7-sulfonic acid is made to act upon intermediate products derived from para-diamins and the oxy-carboxylic acids of the benzene series, coloring-matters are obtained dyeing unmordanted cotton in yellowish to bluish claret-red shades of good fastness, being especially distinguished from all other similar dyestuffs by their great fastness to light. In order to form such dyes, there may be employed as diamins benzidin, tolidin, dianisidin, para-phenylenediamin and as oxy-carboxylic acids those of the benzene and their homologues.

The following is an example of how to carry out my invention, the parts being by weight:

Dyestuff from

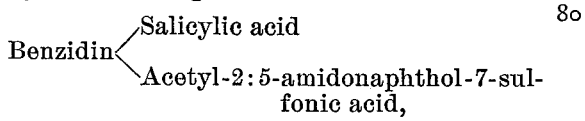

Dissolve 9.2 parts of benzidin in 28.5 parts of hydrochloric acid of 20° Baumé and three hundred parts of water, and at a temperature of 5° centigrade tetrazotize by adding a solution of seven parts of sodium nitrite in fifty parts of water. Then pour the tetrazo liquid in an ice-cold solution of 7.3 parts of salicylic acid and twenty-four parts of sodium carbonate in four hundred parts of water. To the intermediate product thus formed add a solution 14.8 parts of acetyl-2:5-amidonaphthol-7-sulfonic acid, allow to stand for twenty-four hours in order to complete the reaction, then raise slowly the temperature up to 80° to 90° centigrade, precipitate with common salt, press, and dry. The coloring-matter thus obtained forms in its dry state a brownish-violet powder hardly soluble in cold and readily soluble in hot water with a yellowish-red color and dyes unmordanted cotton a yellowish claret-red fast to light and washing.

Now what I claim, and desire to secure by Letters Patent, is the following:

1. The herein-described process of producing claret-red disazo coloring-matters consisting in the combination of the intermediate products from para-diamins and the oxy-carboxylic acids of the benzene series, with acetyl-amidonaphthol-sulfonic acid.

2. As new articles of manufacture the claret-red disazo dyestuffs herein described resulting from the combination of the intermediate products from para-diamins and oxy-carboxylic acids with the acetyl-2:5-amidonaphthol-7-sulfonic acid of the formula

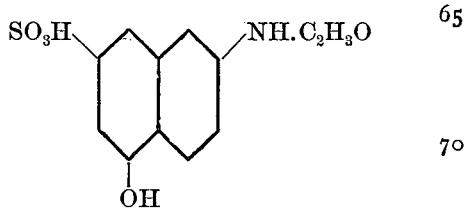

hardly soluble in cold, readily soluble in hot water with a yellowish-red color and dyeing unmordanted cotton a yellowish claret-red.

3. As a new article of manufacture the dyestuff, the constitution of which is represented by the following scheme

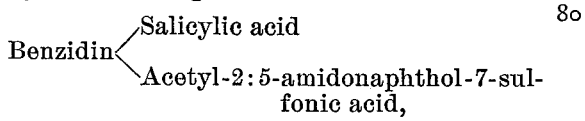

which forms in its dry state a brownish-violet powder, scarcely soluble in cold, readily soluble in hot water, yielding a yellowish-red solution, from which on adding concentrated sodium lye, a yellowish red, and on adding hydrochloric acid, a brownish-yellow precipitate falls down, dissolves in concentrated sulfuric acid to a bluish-violet solution, from which on adding water a brownish-red precipitate separates, and dyes unmordanted cotton a yellowish claret-red, very fast to light and washing.

In testimony whereof I have signed my name to this specification in the presence of two subscribing witnesses.

JULIUS HERBABNY.

Witnesses:
JEAN GRUND,
RICHARD GUENTHER.